United States Patent
Onohara et al.

(10) Patent No.: US 10,880,720 B2
(45) Date of Patent: Dec. 29, 2020

(54) REPRODUCTION DEVICE, INFORMATION PROCESSING METHOD, AND PROGRAM

(71) Applicant: SONY CORPORATION, Tokyo (JP)

(72) Inventors: Takashi Onohara, Tokyo (JP); Koji Fujita, Tokyo (JP); Ryo Sokabe, Saitama (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/470,698

(22) PCT Filed: Jan. 5, 2018

(86) PCT No.: PCT/JP2018/000088
§ 371 (c)(1),
(2) Date: Jun. 18, 2019

(87) PCT Pub. No.: WO2018/146982
PCT Pub. Date: Aug. 16, 2018

(65) Prior Publication Data
US 2020/0092702 A1    Mar. 19, 2020

(30) Foreign Application Priority Data
Feb. 13, 2017  (JP) ................................ 2017-023902

(51) Int. Cl.
*H04W 8/00* (2009.01)
*G06F 3/0482* (2013.01)
(Continued)

(52) U.S. Cl.
CPC .......... *H04W 8/005* (2013.01); *G06F 3/0482* (2013.01); *H04W 88/02* (2013.01); *H04W 92/08* (2013.01)

(58) Field of Classification Search
CPC ...... H04W 8/005; H04W 88/02; H04W 92/08
See application file for complete search history.

(56) References Cited

U.S. PATENT DOCUMENTS

| | | | |
|---|---|---|---|
| 2005/0073521 A1* | 4/2005 | Watanabe | H04L 67/36 345/440 |
| 2008/0242220 A1* | 10/2008 | Wilson | G06F 3/04817 455/3.04 |

(Continued)

FOREIGN PATENT DOCUMENTS

| | | |
|---|---|---|
| JP | 2004-342437 | 12/2004 |
| JP | 2005-064855 | 3/2005 |

(Continued)

OTHER PUBLICATIONS

International Search Report for PCT/JP2018/000088; dated Mar. 20, 2018 (Year: 2018).*

(Continued)

*Primary Examiner* — Benjamin H Elliott, IV
(74) *Attorney, Agent, or Firm* — Sheridan Ross P.C.

(57) ABSTRACT

A reproduction apparatus according to an embodiment of the present technology includes a reproduction unit, a detection unit, and a generation unit. The reproduction unit can reproduce a content. The detection unit receives a beacon signal transmitted from a different reproduction apparatus capable of reproducing the content, and detects one or more nearby reproduction apparatuses that are located in a vicinity. The generation unit generates an operation image including a first area in which an own apparatus is displayed and a second area in which the detected one or more nearby reproduction apparatuses are displayed in an order based on the received beacon signal.

20 Claims, 10 Drawing Sheets

(51) Int. Cl.
*H04W 88/02* (2009.01)
*H04W 92/08* (2009.01)

(56) References Cited

U.S. PATENT DOCUMENTS

| | | | | |
|---|---|---|---|---|
| 2009/0138921 | A1* | 5/2009 | Miyata | H04L 12/2838 725/80 |
| 2011/0269400 | A1* | 11/2011 | Kweon | H04L 67/303 455/41.2 |
| 2011/0301722 | A1* | 12/2011 | Sato | H04L 12/2816 700/17 |
| 2012/0208462 | A1* | 8/2012 | Lee | H04W 8/005 455/41.2 |
| 2012/0324362 | A1* | 12/2012 | Jung | H04N 21/482 715/738 |
| 2013/0007202 | A1* | 1/2013 | Lee | G06F 1/1626 709/217 |
| 2014/0372558 | A1* | 12/2014 | Fontaine | H04W 80/00 709/217 |
| 2015/0128194 | A1* | 5/2015 | Kuang | H04N 21/41407 725/81 |
| 2015/0143423 | A1* | 5/2015 | Park | G06F 3/041 725/40 |
| 2015/0187363 | A1* | 7/2015 | Azumatani | H04R 27/00 704/500 |
| 2015/0347511 | A1* | 12/2015 | Schmidt | G06F 16/48 707/769 |
| 2016/0105859 | A1* | 4/2016 | Zhu | H04W 76/11 370/350 |
| 2016/0134942 | A1* | 5/2016 | Lo | H04N 21/4825 725/51 |
| 2016/0253145 | A1* | 9/2016 | Lee | H04W 4/06 381/79 |
| 2017/0127056 | A1* | 5/2017 | Batmunkh | H04N 9/75 |
| 2019/0289348 | A1* | 9/2019 | Mayalil | H04N 21/475 |
| 2020/0092702 | A1* | 3/2020 | Onohara | H04W 8/005 |

FOREIGN PATENT DOCUMENTS

| | | |
|---|---|---|
| JP | 2009-129194 | 6/2009 |
| JP | 2010-523023 | 7/2010 |

OTHER PUBLICATIONS

International Search Report prepared by the Japan Patent Office dated Mar. 7, 2018, for International Application No. PCT/JP2018/000088.

* cited by examiner

REPRODUCTION DEVICE, INFORMATION PROCESSING METHOD, AND PROGRAM

CROSS REFERENCE TO RELATED APPLICATIONS

This application is a national stage application under 35 U.S.C. 371 and claims the benefit of PCT Application No. PCT/JP2018/000088 having an international filing date of 5 Jan. 2018, which designated the United States, which PCT application claimed the benefit of Japanese Patent Application No. 2017-023902 filed 13 Feb. 2017, the entire disclosures of each of which are incorporated herein by reference.

TECHNICAL FIELD

The present technology relates to a reproduction apparatus that reproduces a content, an information processing method capable of being applied thereto, and a program.

BACKGROUND ART

Conventionally, a system is known in which a home network is constructed in a house, and a reproduction apparatus connected thereto reproduces a content such as music and video. For example, in a reproduction system disclosed in Patent Literature 1, a control apparatus used by a user detects a nearby reproduction apparatus by using near field communication. Further, a reproduction apparatus capable of being communicated with a server apparatus that holds a content selected by the user via a network is detected. In the case where the reproduction apparatuses capable of being communicated with the server apparatus include nearby reproduction apparatuses, a list is displayed in which the nearby reproduction apparatuses are arranged on an upper portion thereof. This enables a user to easily select a nearby reproduction apparatus, and thus a content can be reproduced (paragraphs [0039] to [0055] and the like in the description of Patent Literature 1).

CITATION LIST

Patent Literature

Patent Literature 1: Japanese Patent Application Laid-open No. 2009-129194

DISCLOSURE OF INVENTION

Technical Problem

As described above, in a system that controls reproduction of a content via a network and the like, a technology capable of improving convenience of a user is being demanded.

In view of the circumstances as described above, an object of the present technology is to provide a reproduction apparatus capable of improving convenience of a user which relates to reproduction control of a content, an information processing method, and a program.

Solution to Problem

To achieve the above object, a reproduction apparatus according to an embodiment of the present technology includes a reproduction unit, a detection unit, and a generation unit.

The reproduction unit is capable of reproducing a content.

The detection unit receives a beacon signal transmitted from a different reproduction apparatus capable of reproducing the content, and detects one or more nearby reproduction apparatuses that are located in a vicinity.

The generation unit generates an operation image including a first area in which an own apparatus is displayed and a second area in which the detected one or more nearby reproduction apparatuses are displayed in an order based on the received beacon signal.

In the reproduction apparatus, by receiving the beacon signal, the nearby reproduction apparatus is detected. Then, the operation image including the own apparatus and the nearby reproduction apparatus. As a result, the reproduction of the content by the own apparatus, the reproduction of the content by the nearby reproduction apparatus, and the like can be easily controlled, with the result that it is possible to improve the convenience of a user.

The reproduction apparatus may further include a reproduction control unit that causes the reproduction unit to reproduce the content in a case where the one or more nearby reproduction apparatuses are not detected.

As a result, for example, it is possible to avoid a situation in which the content is not reproduced and the like.

The first area may be set above the second area in the operation image.

As a result, for example, it is easily for the user to select the reproduction apparatus.

The generation unit may cause the one or more nearby reproduction apparatuses to be displayed in the second area in an order in which an intensity of the received beacon signal is large.

As a result, the nearby reproduction apparatuses are displayed in the order of a closer distance, which makes selection of the reproduction apparatus easier.

The reproduction control unit may select, from the one or more nearby reproduction apparatuses displayed in the second area, the different reproduction apparatus as a subject that is instructed to reproduce the content.

As a result, for example, it is possible to automatic reproduction of the content while saving a selection operation of the reproduction apparatus and the like.

The reproduction control unit may instruct the nearby reproduction apparatus to reproduce the content displayed on an uppermost position in the second area.

As a result, for example, when the user who holds the reproduction apparatus approaches the desired different reproduction apparatus, it is possible to cause the different reproduction apparatus to reproduce the content.

The generation unit may cause at least one of a distance from the reproduction apparatus to each of the nearby reproduction apparatuses and apparatus information relating to the nearby reproduction apparatuses to be displayed in the second area as information of the nearby reproduction apparatuses.

As a result, for example, it is easy for the user to select the reproduction apparatus.

The apparatus information relating to the nearby reproduction apparatuses may include information of functional components that constitute the nearby reproduction apparatuses.

As a result, for example, it is possible to select on the basis of a function of the reproduction apparatus and the like.

The generation unit may cause a displaying order at a time of displaying in the second area in a past to be displayed in the second area as information of the nearby reproduction apparatuses.

As a result, for example, it is easy for the user to select the reproduction apparatus.

The generation unit may cause the different reproduction apparatus that is detected as the nearby reproduction apparatus in a past, and is not detected as the nearby reproduction apparatus currently to be displayed in the operation image recognizably.

As a result, it is possible to easily grasp the different reproduction apparatus which is detected in the past but is not detected currently.

The generation unit may select, from the one or more nearby reproduction apparatuses displayed in the second area, the nearby reproduction apparatus optimal for reproduction of the content, and cause the optimal nearby reproduction apparatus to be displayed in the second area recognizably.

As a result, for example, it is easy for the user to select the reproduction apparatus.

The detection unit may detect the different reproduction apparatus that transmits the beacon signal as the nearby reproduction apparatus in a case where an intensity of the received beacon signal is equal to or more than a predetermined threshold value.

As a result, it is possible to detect the nearby reproduction apparatus with high accuracy.

The detection unit may detect the different reproduction apparatus that transmits the received beacon signal as the nearby reproduction apparatus.

As a result, it is possible to reduce a process load on the nearby reproduction apparatus.

The reproduction apparatus may be capable of being held by the user.

By holding this reproduction apparatus, the convenience of the user relating to the reproduction control for the content is improved.

An information processing method according to an embodiment of the present technology is an information processing method performed by a computer system, the method including receiving a beacon signal transmitted from a different reproduction apparatus capable of reproducing a content, and detecting one or more nearby reproduction apparatuses that are located in a vicinity.

Generating an operation image including a first area in which an own apparatus is displayed and a second area in which the detected one or more nearby reproduction apparatuses are displayed in an order based on the received beacon signal is performed.

A program according to an embodiment of the present technology causes a computer system to execute a step of receiving a beacon signal transmitted from a different reproduction apparatus capable of reproducing a content, and detecting one or more nearby reproduction apparatuses that are located in a vicinity, and a step of generating an operation image including a first area in which an own apparatus is displayed and a second area in which the detected one or more nearby reproduction apparatuses are displayed in an order based on the received beacon signal.

Advantageous Effects of Invention

As described above, according to the present technology, it is possible to improve the convenience of a user relating to the reproduction control for the content. It should be noted that the effects described herein are not necessarily limited, and any effect described in this disclosure may be exerted.

MODE(S) FOR CARRYING OUT THE INVENTION

Hereinafter, embodiments according to the present technology will be described with reference to the drawings.

[Content Reproduction System]

Figure 1:
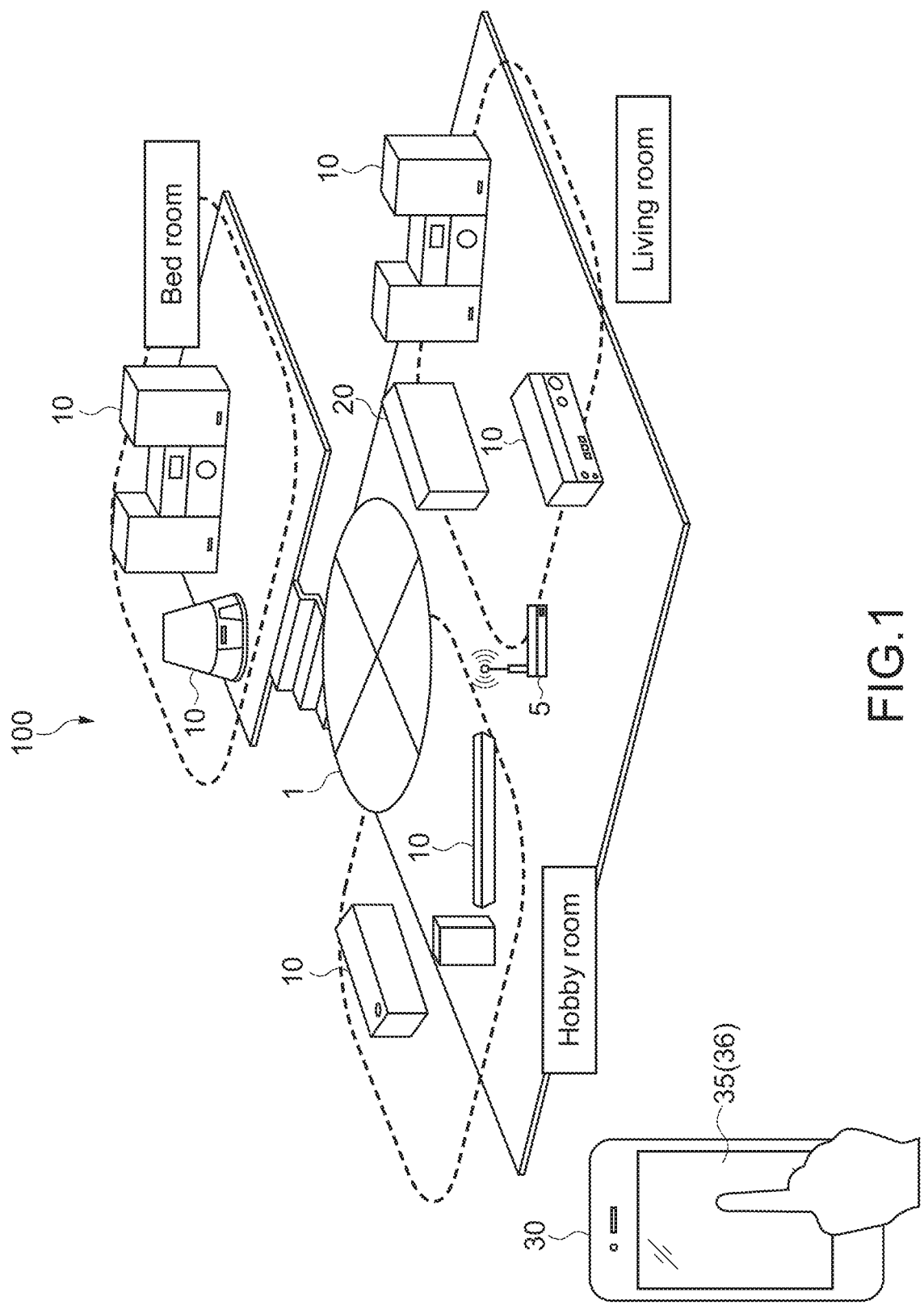
FIG. 1 A schematic view showing a configuration example of a content reproduction system according to an embodiment.

FIG. 1 is a schematic view showing a configuration example of a content reproduction system according to an embodiment of the present technology. A content reproduction system 100 includes a home network 1 constructed in a house, a plurality of reproduction apparatuses 10 connected to this, a server apparatus 20 that provides contents, and a mobile terminal 30.

The plurality of reproduction apparatuses 10, the server apparatus 20, and the mobile terminal 30 are connected to the home network 1 via an access point 5 by wireless LAN communication such as WiFi and the like. As the home network 1, for example, a network compliant with a DLNA (registered trademark) (Digital Living Network Alliance) standard is used.

For example, the plurality of reproduction apparatuses 10 functions as a DMR (Digital Media Renderer), and the server apparatus 20 functions as a DMS (Digital Media Server). Further, the mobile terminal 30 functions as a DMC (Digital Media Controller). It should be noted that the present technology can be applied to the case where a network that uses another protocol is constructed.

As shown in FIG. 1, the plurality of reproduction apparatuses 10 are disposed in a living room, a hobby room, and a bed room, respectively. The mobile terminal 30 uses, for example, a control message or the like of UPnP (Universal Plug and Play) to transmit, to the respective reproduction apparatuses 10, an instruction to obtain a content from the server apparatus 20 and reproduce the content.

Thus, a user operates the mobile terminal 30, thereby making it possible to control reproduction operations of the reproduction apparatuses 10 disposed in the respective rooms. For example, it is possible to perform various kinds of control including power supply control for the reproduction apparatuses 10 (for example, switching between a standby state and an active state), control of a reproduction volume of a content, switching of contents to be reproduced, and fade-in/fade-out of a content.

Further, the assumption is made that the home network 1 and a global network are connected with each other via a home gateway (not shown). In this case, by operating the mobile terminal 30, a content in a content server that exists on the global network (on a cloud) can be reproduced through the respective reproduction apparatuses 10.

Further, it is also possible to perform transfer or streaming delivery of a content stored in the mobile terminal 30 to the reproduction apparatuses 10 and reproduce the content, and reproduce a local content in the reproduction apparatuses 10. The local content in the reproduction apparatuses 10 refers to a content read through a CD or a USB and a content taken through a radio or the like, for example.

In this embodiment, it is also possible to reproduce a content by the mobile terminal 30. For example, the mobile terminal 30 obtains and reproduces a content in a content server of the server apparatus 20 or on the global network. Alternatively, the mobile terminal 30 obtains and reproduces a content stored in the reproduction apparatuses 10. Of course, it is also possible to reproduce a content in the mobile terminal 30.

In this embodiment, the mobile terminal 30 corresponds to a "reproduction apparatus". Further, the reproduction apparatus 10 corresponds to a "different reproduction apparatus". The numbers of reproduction apparatuses 10, server apparatuses 20, and the like are not limited.

In this embodiment, by the plurality of reproduction apparatuses 10 and the mobile terminal 30, a music content is reproduced. However, the present technology can be applied not only to reproduction of music contents but also to reproduction of various contents such as videos.

As the reproduction apparatus 10, for example, various CE (Consumer Electronics) apparatuses such as a television set, PC (Personal Computer), an audio-video receiver, a video monitor, and a home game machine are used. Further, a vehicle-mounted audio mounted on a vehicle, a headphone put on a user, and the like are used as the reproduction apparatus 10.

As the server apparatus 20, for example, a PC, a network-compatible HDD (NAS), or the like is used. Typically, the mobile terminal 30 has a configuration held by the user, and various PDAs (Personal Digital Assistants) such as a smartphone, a tablet terminal, and the like are used. In addition, various computers capable of reproducing contents may be used.

[Configuration of Mobile Terminal]

Figure 2:
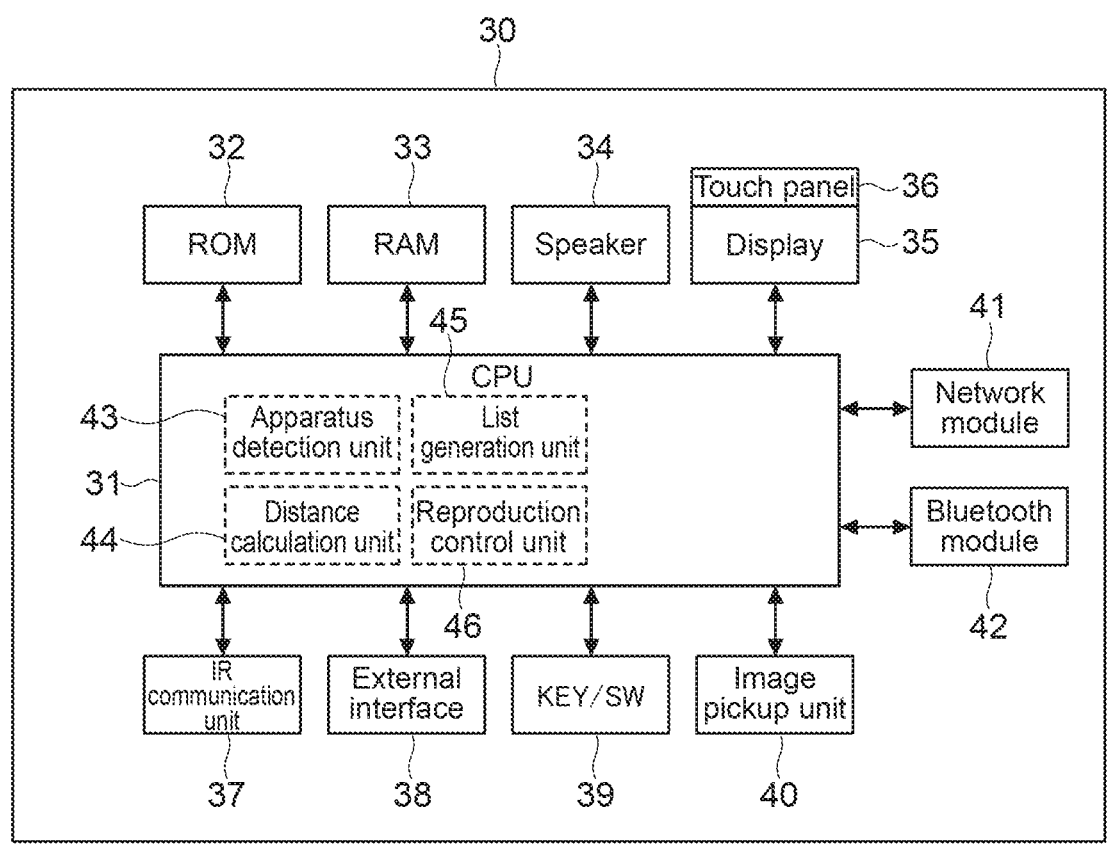
FIG. 2 A block diagram showing a configuration example of a mobile terminal.

FIG. 2 is a block diagram showing a configuration example of the mobile terminal 30. The mobile terminal 30 includes a CPU (Central Processing Unit) 31, a ROM (Read Only Memory) 32, a RAM (Random Access Memory) 33, a speaker 34, a display 35, and a touch panel 36. Further, the mobile terminal 30 includes an infrared (IR) communication unit 37, an external interface 38, a key/switch 39, and an image pickup unit 40. Further, the mobile terminal 30 includes a network module 41 and a Bluetooth (registered trademark) module 42.

The CPU 31 transmits and receives signals to and from respective blocks of the mobile terminal 30 to perform various calculations, and performs overall control of various processes executed in the mobile terminal 30, such as a reproduction instruction of a content to the reproduction apparatuses 10, displaying a GUI (Graphical User Interface) on the display 35 (touch panel 36), and the like.

The ROM 32 stores various kinds of data to be processed by the CPU 31, such as image data and metadata and various programs such as an application. The RAM 33 is used as a work area for the CPU 31. At a time when a program such as an application is executed, various kinds of data necessary for the execution is read into the RAM 33.

Instead of or in addition to the ROM 32, an HDD (Hard Disk Drive), a flash memory, or another non-volatile memory such as a solid-state memory may be provided. Further, in the storage device, the various kinds of data and the programs described above may be stored.

The speaker 34 outputs reproduction of a music content, a voice guide to a user, and the like. The display 35 is a display device using liquid crystal, EL (Electro-Luminescence), or the like, for example, and displays various GUIs and the like. As shown in FIG. 2, the display 35 is configured integrally with the touch panel 36. In this embodiment, the speaker 34 and the display 35 (touch panel 36) function as a reproduction unit capable of reproducing a content.

The IR communication unit 37 is a module for performing IR communication with an external apparatus. The external interface 38 is an interface for connecting with the external apparatus on the basis of, for example, a standard of a USB or an HDMI (registered trademark) (High-Definition Multimedia Interface), or the like.

The key/switch 39 receives, for example, power supply switch, a shortcut key, and the like, in particular, operations or the like by a user which cannot be input through the touch panel 36. The image pickup unit 40 includes a CMOS (Complementary Metal Oxide Semiconductor) sensor, a CCD (Charge Coupled Devices) sensor, or the like, and generates a digital image of a subject, for example.

The network module 41 is an interface for connecting to the home network 1, and for example, a wireless LAN module such as WiFi is used therefor. When the network module 41 is operated, with the reproduction apparatuses 10 or with server apparatus 20, wireless communication can be performed.

The Bluetooth module 42 is a module for performing near field communication compliant with the Bluetooth standard among the plurality of reproduction apparatuses 10. In this embodiment, communication (BLE communication) compliant with the BLE (Bluetooth Low Energy) standard and near field communication (BT communication) compliant with the Classic Bluetooth can be performed.

Through the BLE communication and the BT communication, it is possible to control the operation of the reproduction apparatuses 10. For example, even with respect to a non-network-compatible reproduction apparatus which is not connected to the home network 1, it is possible to control an operation thereof through the near field communication such as the BLE communication. For example, it is possible to give an instruction to reproduce a content, perform power supply control, and the like.

Further, the Bluetooth module 42 can receive a beacon signal compliant with the BLE standard. Information included in a received beacon signal is output to the CPU 31, and various kinds of processes are performed. Further, on the basis of an intensity (radio field intensity) of the beacon signal, it is also possible to calculate a distance with the apparatus that outputs the beacon signal. It should be noted that near field communication and a beacon signal compliant with a different standard may be used.

The information processing by the mobile terminal 30 having the hardware configuration as described above is achieved in cooperation of software stored in the ROM 32 or the like and a hardware resource of the mobile terminal 30 with each other. For example, when the CPU 31 loads, into the RAM 33, and executes a program (application) stored in the ROM 32 or the like according to the present technology, an information processing method according to the present technology is achieved.

As shown in FIG. 2, in this embodiment, the CPU 31 executes a predetermined program, thereby achieving an apparatus detection unit 43, a distance calculation unit 44, a list generation unit 45, and a reproduction control unit 46, which are functional blocks. In order to achieve those blocks, dedicated hardware such as an IC (integrated circuit) or the like may be used as appropriate.

The program such as the application is installed from the global network into the mobile terminal 30, for example. Alternatively, the program may be installed into the mobile terminal 30 through a recording medium.

Figure 3:
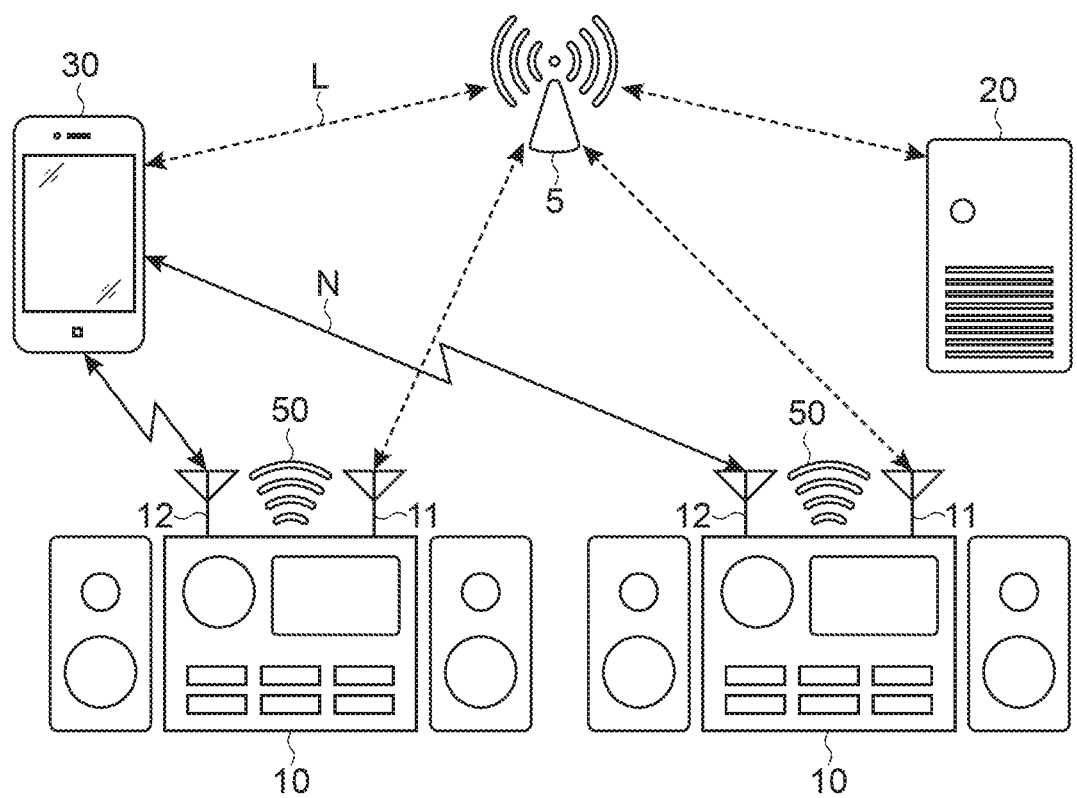
FIG. 3 A diagram schematically showing a plurality of reproduction apparatuses, a server device, and a connection form of the mobile terminal.

FIG. 3 is a diagram schematically showing a connection form of the plurality of reproduction apparatuses 10, the server apparatus 20, and the mobile terminal 30. It should be noted that, to the plurality of reproduction apparatuses 10, a network module 11 and a Bluetooth module 12 are provided respectively.

As described above, the plurality of reproduction apparatuses 10, the server apparatus 20, and the mobile terminal 30 can be connected by the wireless LAN communication via the access point 5 (broken-line arrow L). The mobile terminal 30 transmits a control message or the like, thereby making it possible to control a reproduction operation of a content by the reproduction apparatuses 10.

Further, by the BLE communication or the like, the mobile terminal 30 can be directly connected to the respective reproduction apparatuses 10 (solid-line arrow N). By the BLE communication or the like, it is possible to control the reproduction operation by the reproduction apparatuses 10. Further, by the Bluetooth module 12 of the respective reproduction apparatuses 10, a beacon signal 50 is output. The beacon signal 50 includes a unique ID such as equipment information including a model number and the like of the reproduction apparatuses 10 and a Bluetooth address.

[Reproduction Control for Content]

Reproduction control for a content by the content reproduction system 100 will be described. First, detection of the reproduction apparatus 10 by the apparatus detection unit 43 will be described.

For example, by a user, an application for using the content reproduction system 100 is started. Via the home network 1, from the mobile terminal 30, a device search message (M-SEARCH message) is transmitted in a multicast manner. By the reproduction apparatus 10 connected to the home network 1, in accordance with the device search message, a device response message (M-SEARCH message) is returned. As a result, the reproduction apparatus 10 is detected.

With respect to the detected reproduction apparatuses 10, apparatus information relating to the reproduction apparatus 10 is requested. For example, request message that is generated by using a method such as HTTP GET or is used. As the apparatus information, a beacon ID of the beacon signal 50 transmitted by the reproduction apparatus 10 is included.

In addition, the equipment information includes, for example, a model number of the reproduction apparatus 10, a model name, a brand surface, an exterior color, and the like. Further, the apparatus information includes functional information such as a kind of a reproduceable content. Furthermore, the apparatus information includes functional components that constitute the reproduction apparatus 10, for example, system information of a speaker, an amplifier, and the like. In addition, the apparatus information may include arbitrary information relating to the reproduction apparatus 10. The obtained apparatus information is stored in the ROM 32 or the like of the mobile terminal 30.

It is also possible to detect the reproduction apparatus 10 on the basis of the beacon signal 50 transmitted by the reproduction apparatuses 10. For example, the beacon signals 50 transmitted from the reproduction apparatus 10 at a predetermined interval is received by the Bluetooth module 42 of the mobile terminal 30. As a result, the apparatus detection unit 43 detects the reproduction apparatus 10 that transmits the beacon signal 50.

To the detected reproduction apparatus 10, a request of BLE connection is transmitted. In response to the request, the mobile terminal 30 and the reproduction apparatus 10 are brought into a BLE connection state, the BLE communication (arrow N shown in FIG. 3) is established. Before the transmission of the request of the BLE connection, a list or the like of the detected reproduction apparatuses 10 may be displayed, and a user may select the reproduction apparatus 10 that performs the BLE connection.

When the BLE communication is established, with respect to the reproduction apparatuses 10, the apparatus information relating to the reproduction apparatuses 10 is requested. The beacon ID, the equipment information, and the like included in the beacon signal 50 are obtained along with reception of the beacon signal 50. Therefore, information that is not included in the beacon signal 50 is requested to the reproduction apparatus 10. The obtained apparatus information (including information included in the beacon signal 50) is stored in the ROM 32 or the like.

It should be noted that the BLE connection can use a form in which pairing is performed or a form in which connection is performed without pairing. In the case where pairing is performed, between the mobile terminal 30 and the reproduction apparatus 10, passkey authentication or the like is performed.

In order to establish the BT communication, the apparatus detection unit 43 transmits a request of the BT information by broadcasting. In the case where the reproduction apparatus 10 in a pairing mode exists, the reproduction apparatuses 10 returns BT information including a Bluetooth address and the like. As a result, it is possible to detect the reproduction apparatus 10.

To the detected reproduction apparatus 10, the pairing request is transmitted. In response to the request, when passkey authentication and the like are performed, the mobile terminal 30 and the reproduction apparatus 10 are brought into a pairing state, the BT communication is established. Before the transmission of the request of the pairing, through a list or the like of the detected reproduction apparatuses 10, a user may select the reproduction apparatus 10 for which the pairing is performed.

When the BLE communication is established, to the reproduction apparatus 10, apparatus information relating to the reproduction apparatus 10 is requested. Then, the apparatus information including the beacon ID, the equipment information, the functional information, system information, and the like is obtained. The obtained apparatus information is stored in the ROM 32 and the like of the mobile terminal 30.

Figure 4:
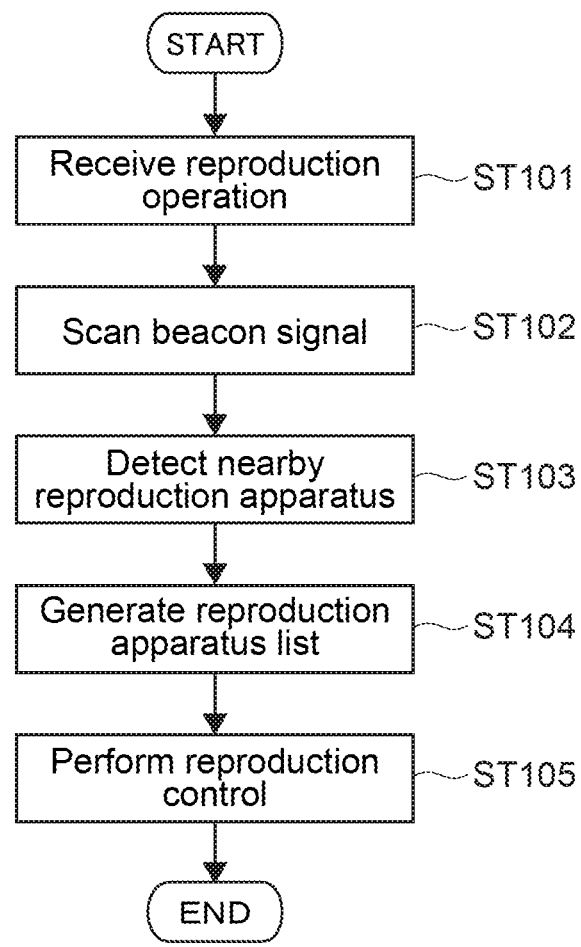
FIG. 4 A flowchart showing an example of a reproduction process of a content.
Figure 5:
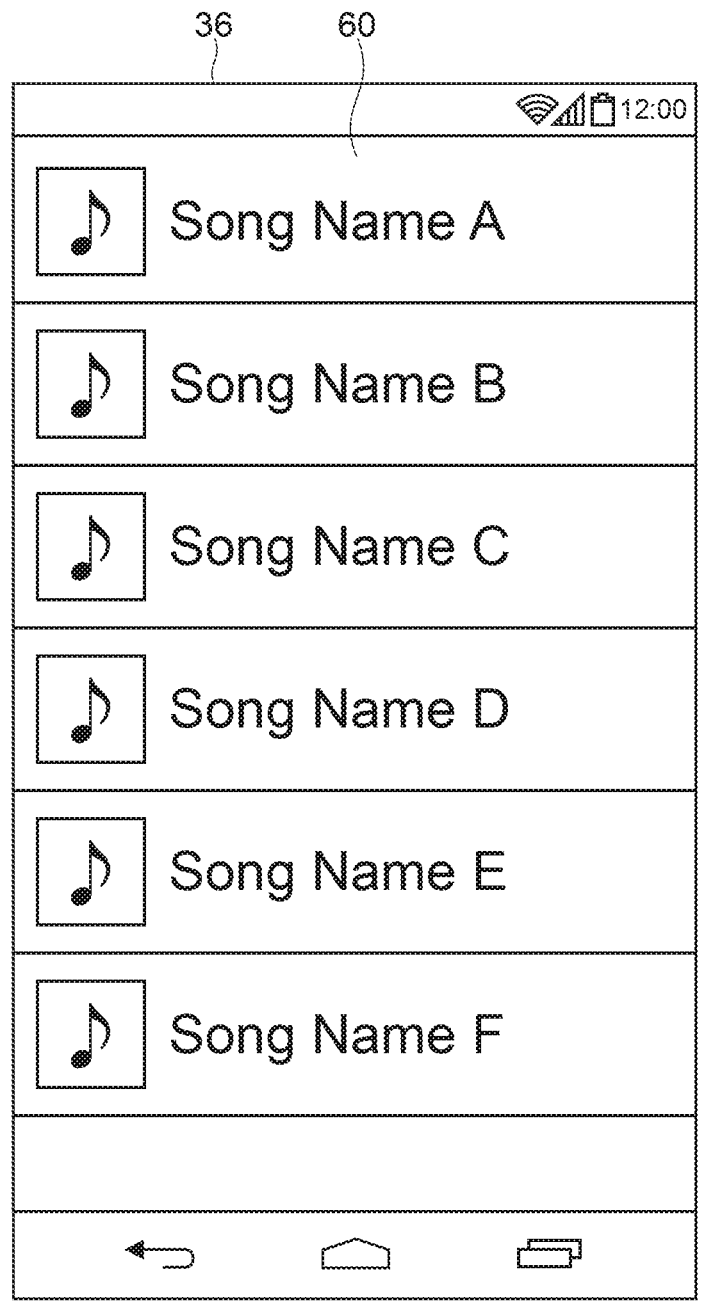
FIG. 5 A schematic diagram showing an example of a content list.

FIG. 4 is a flowchart showing an example of a reproduction process of a content. FIG. 5 to FIG. 8 are diagrams each showing an example of a GUI to be displayed on the touch panel 36 of the mobile terminal 30. First, a content reproduction operation by a user is received (Step 101). For example, as shown in FIG. 5, from a content list 60 displayed on the touch panel 36, a content which is desired to be reproduced is selected. The selection of the content is input as the reproduction operation. Of course, the reproduction operation is not limited to this.

It should be noted that a method of generating the content list 60 is not limited, for example, the list is generated on the basis of contents held in the server apparatus 20, the mobile terminal 30, and the like. Of course, a list of contents held in a content server on a global network may be displayed.

The beacon signal 50 transmitted from the reproduction apparatus 10 is scanned (Step 102). On the basis of the beacon signal 50 received by the Bluetooth module 42, the apparatus detection unit 43 performs neighborhood detection of the reproduction apparatus 10. In this embodiment, the beacon ID included in the received beacon signal 50 and the beacon ID in the apparatus information stored in the ROM 32 and the like are checked, and the reproduction apparatus 10 that has transmitted the beacon signal 50 is identified.

It should be noted that this is not limited to the case where the reproduction apparatus 10 is already detected through the network communication, the BLE communication, or the like before the scanning of the beacon signal 50 in Step 102. For example, by scanning in Step 102, the reproduction apparatus 10 can be detected for the first time. In this case, on the basis of the beacon signal 50, the BLE communication is established, and the apparatus information is obtained. As a result, it is possible to identify the reproduction apparatus 10 that has transmitted the beacon signal 50.

In this embodiment, it is determined whether the reproduction apparatus 10 identified on the basis of the beacon ID by the apparatus detection unit 43 can reproduce the content selected by the user or not (Hereinafter, this is referred to as condition 1). Further, the apparatus detection unit 43 determines whether the intensity of the received beacon signal 50 is equal to or more than a predetermined threshold value or not (Hereinafter, this is referred to as condition 2). In the case where a result of the determination of the condition 1 is positive, and a result of the determination of the condition 2 is also positive, the reproduction apparatus 10 that has transmitted the beacon signal 50 is detected as the nearby reproduction apparatus 10N (see FIG. 6) (Step 103). As a result, it is possible to detect the nearby reproduction apparatus 10N with high accuracy. It should be noted that the threshold value may be arbitrarily set. In this embodiment, the Bluetooth module 42 and the apparatus detection unit 43 achieve a detection unit.

It should be noted that in this embodiment, on the basis of the intensity of the received beacon signal 50, the distance calculation unit 44 calculates a distance from the mobile terminal 30 to the reproduction apparatus 10 that has transmitted the beacon signal. Instead of the condition 2, whether or not the calculated distance is equal to or more than the predetermined threshold value may be determined. Further, in the case where the determination result is positive, detection may be performed as the nearby reproduction apparatus 10N.

Alternatively, instead of the condition 2, existence or nonexistence of reception of the beacon signal 50 may be determined. In this case, the received reproduction apparatus 10 that has transmitted the beacon signal is detected as the nearby reproduction apparatus 10N. As a result, it is possible to reduce a process load on the detection of the nearby reproduction apparatus 10N. In addition, the method of detecting the nearby reproduction apparatus 10N is not limited. For example, the condition 1 may be omitted, and only on the basis of the condition 2 (which can be changed to determination of the distance or determination of whether existence or nonexistence of reception of the beacon signal), the nearby reproduction apparatus 10N may be detected.

Figure 6:
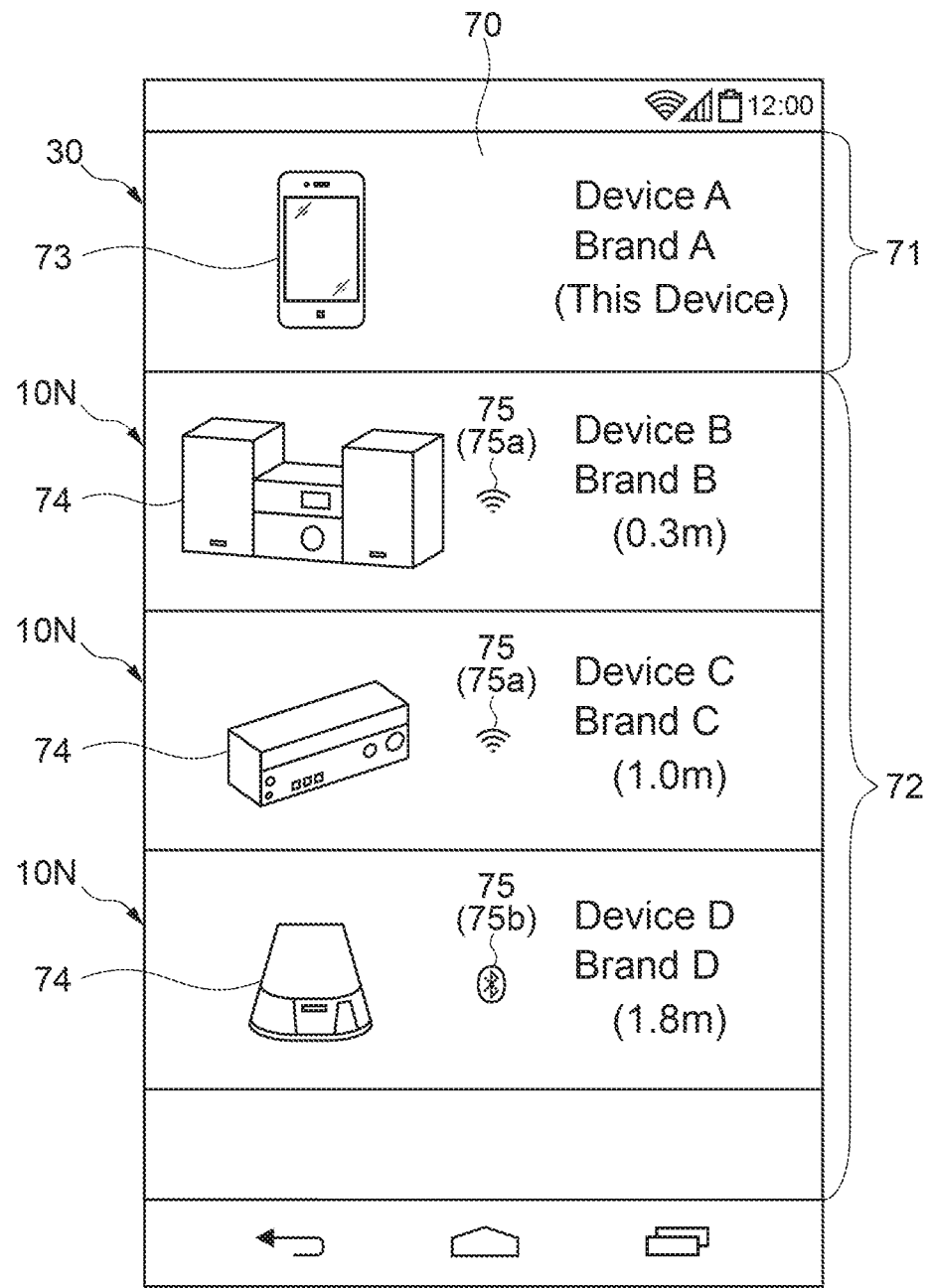
FIG. 6 A schematic diagram showing an example of a reproduction apparatus list in the case where a nearby reproduction apparatus is detected.

The list generation unit 45 generates a reproduction apparatus list (Step 104). FIG. 6 is a schematic diagram showing an example of the reproduction apparatus list. In this embodiment, the reproduction apparatus list corresponds to an operation image.

A reproduction apparatus list 70 includes a first area 71 in which the mobile terminal 30 as an own apparatus is displayed and a second area 72 in which one or more detected nearby reproduction apparatuses 10N are displayed. In the second area 72, the detected nearby reproduction apparatuses 10N are displayed in an order based on the beacon signals 50 received by the mobile terminal 30. Specifically, in an order of the strength of the received beacon signals 50, the nearby reproduction apparatuses 10N are displayed in a descending or ascending order. That is, in an order closer to the mobile terminal 30, the nearby reproduction apparatuses 10N are displayed. Of course, instead of the intensities of the beacon signals 50, on the basis of the distance calculated by the distance calculation unit 44, the nearby reproduction apparatuses 10N may be arranged.

As shown in FIG. 6, in the reproduction apparatus list 70, the first area 71 is displayed on an upper side of the second area 72. In the first area 71, as the information of the mobile terminal 30, an icon 73, a model name, a brand name, and information indicating that this is the own device ("This Device") of the mobile terminal 30 are displayed. Those pieces of information are stored in the ROM 32 or the like of the mobile terminal 30 in advance.

In the second area 72, as the information relating to the nearby reproduction apparatuses 10N, an icon 74, a model name, and a brand name of each of the nearby reproduction apparatuses 10N are displayed. Further, as the information relating to the nearby reproduction apparatuses 10N, a distance from the mobile terminal 30 to each of the nearby reproduction apparatuses 10N and a mark 75 (WiFi mark 75a or Bluetooth mark 75b) that indicates a connection form with the mobile terminal 30 are displayed.

For example, the icon 74 is stored in the ROM or the like in advance and is read as necessary on the basis of the apparatus information. Alternatively, the icon 74 may be included in the apparatus information obtained from each of the reproduction apparatuses 10. Alternatively, from a predetermined server on the global network, the icon 74 of each of the reproduction apparatuses 10 may be obtained. The model name and the brand name are displayed on the basis of the apparatus information. The distance from the mobile terminal 30 is calculated by the distance calculation unit 44. The connection form is stored for each of the reproduction apparatuses 10 at a time when connection that allows communication with the mobile terminal 30 is established.

The reproduction control unit 46 controls reproduction of the content (Step 105). In this embodiment, it is possible to execute an automatic reproduction mode in which the content is automatically reproduced and a manual reproduction mode in which reproduction apparatus 10 that reproduces the content is selected by the user. Typically, the automatic reproduction mode is set as default.

In the automatic reproduction mode, the reproduction control unit 46 automatically selects, from the one or more nearby reproduction apparatuses 10N displayed in the second area 72 of the reproduction apparatus list 70, the reproduction apparatus 10 as a subject to which a content reproduction instruction is given. For example, to the nearby reproduction apparatus 10N listed on an uppermost portion in the second area 72, that is, the reproduction apparatus 10N that is closest to the user who holds the mobile terminal 30, the content reproduction instruction is automatically given. As a result, the user approaches a desired reproduction apparatus 10 and selects the content, thereby making it possible to cause the reproduction apparatus 10 (corresponding to the uppermost reproduction apparatus 10N) to reproduce the content. As a result, it is possible to improve convenience of the user.

Figure 7:
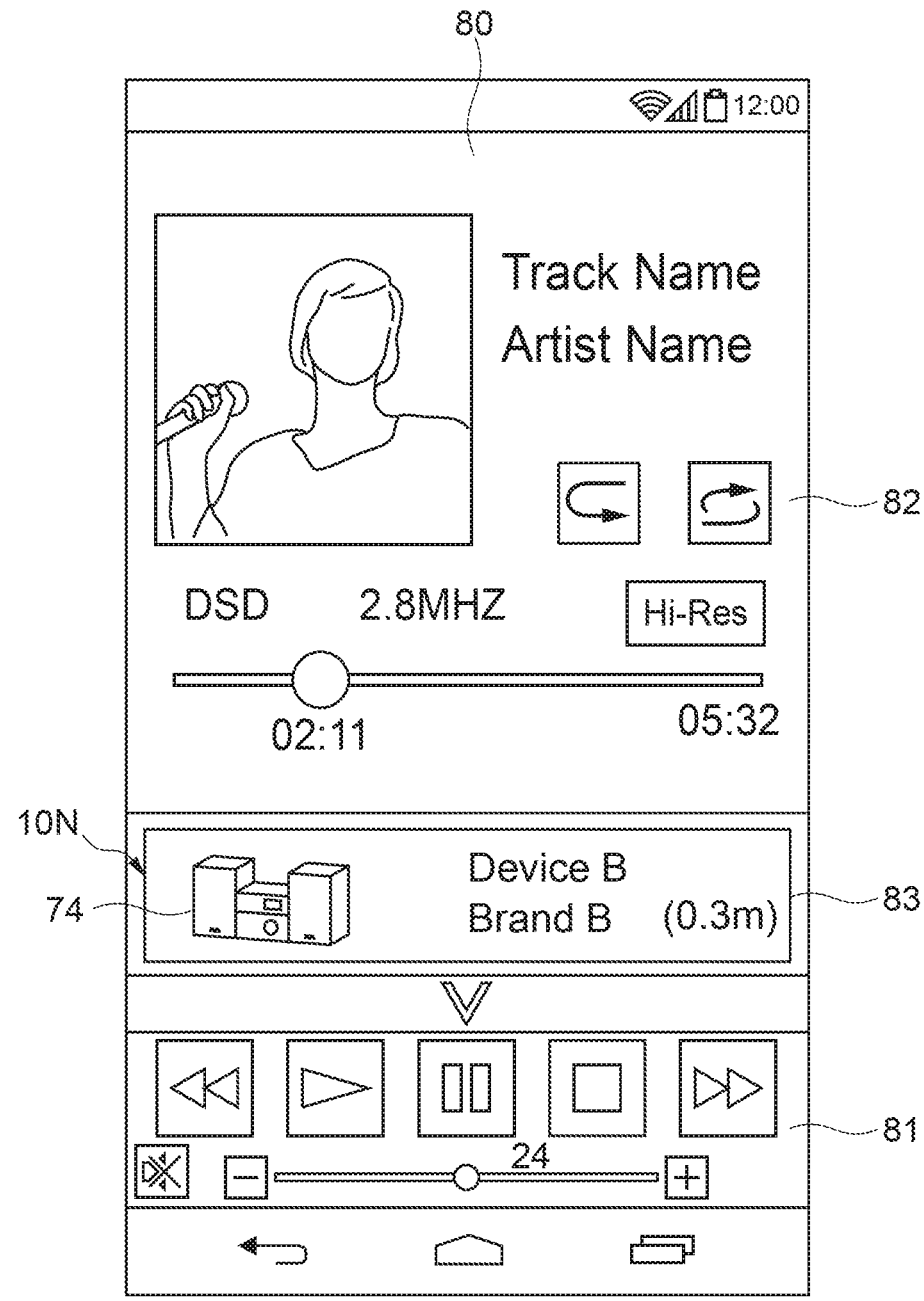
FIG. 7 A schematic diagram showing an example of a reproduction screen displayed during a reproduction of a content.

FIG. 7 is a schematic diagram showing an example of a reproduction screen 80 displayed during reproduction of the content. The reproduction screen 80 includes a reproduction control unit 81, an information display unit 82, and a reproduction apparatus display unit 83. In the reproduction control unit 81, a plurality of control buttons for controlling the content reproduction, a volume adjustment bar, and the like are displayed. By operating the reproduction control unit 81, it is possible to easily control the content reproduction.

In the information display unit 82, information relating to a content which is being reproduced is displayed. For example, a content name, an artist image, a reproduction position, and the like are displayed.

In the reproduction apparatus display unit 83, the nearby reproduction apparatus 10N selected by the reproduction control unit 46 is displayed. In the example shown in FIG. 7, the uppermost reproduction apparatus 10N in the second area 72 is selected. The icon 74, the model name, the brand name, and the distance from the mobile terminal 30 of the reproduction apparatus 10N are displayed. As a result, it is possible to easily grasp the reproduction apparatus 10 that is displaying the content at this time.

In the case where the automatic reproduction mode is set, displaying the reproduction apparatus list 70 generated by the list generation unit 45 may be omitted. That is, when a content is selected from the content list 60 shown in FIG. 5, the reproduction screen 80 shown in FIG. 7 may be displayed without showing the reproduction apparatus list 70.

Figure 8:
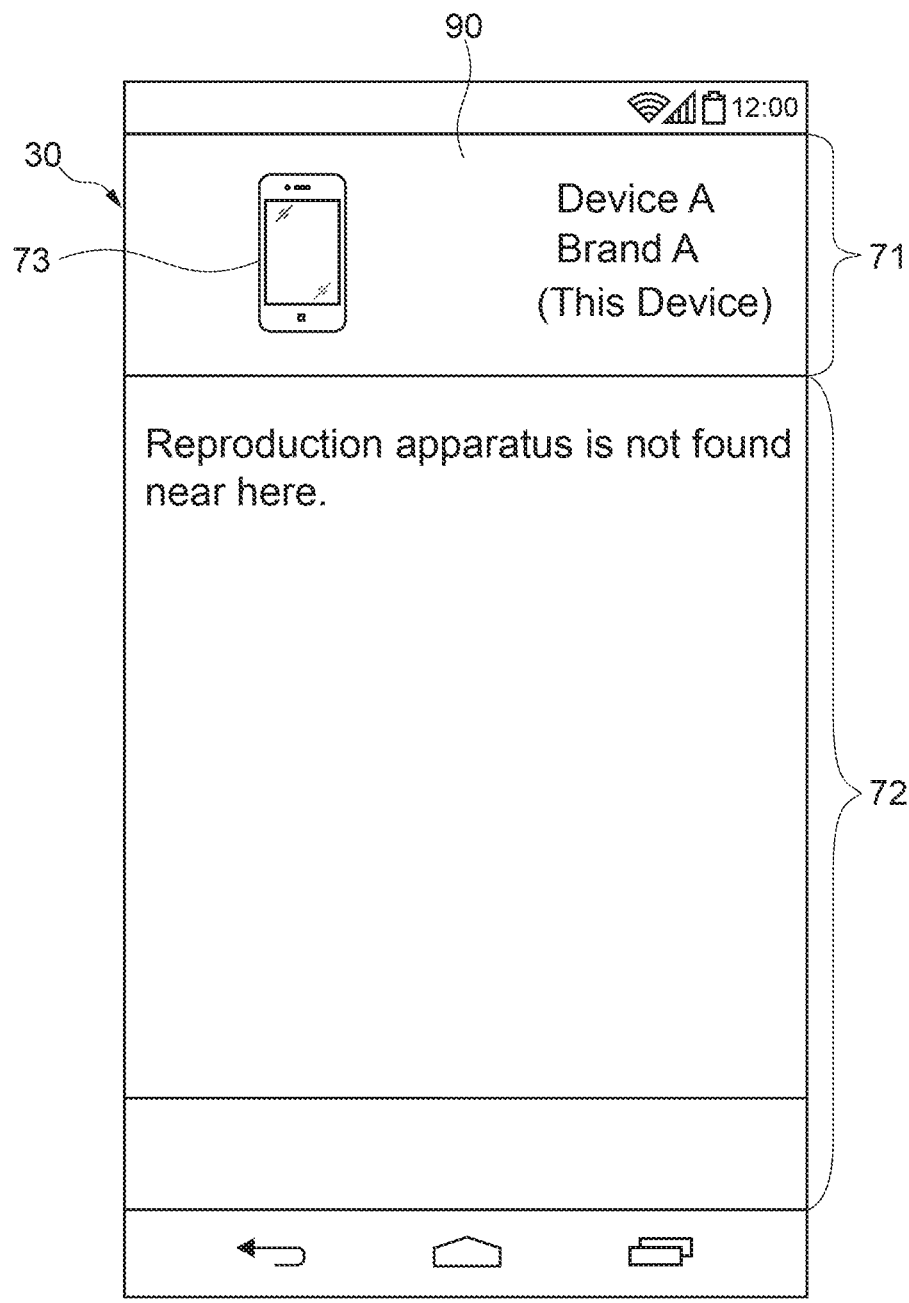
FIG. 8 A schematic diagram showing an example of the reproduction apparatus list in the case where a nearby reproduction apparatus is not detected.

In Step 103, in the case where the nearby reproduction apparatus 10N is not detected, a reproduction apparatus list 90 shown in FIG. 8 is generated. That is, text information and the like is displayed indicating that in the second area 72, the reproduction apparatus 10N is not displayed, and the nearby reproduction apparatus 10N is not detected.

In the case where the nearby reproduction apparatus 10N is not detected, the reproduction control unit 46 causes the mobile terminal 30 as an own apparatus to perform content reproduction. That is, by controlling the speaker 34 and the like that function as the reproduction unit, the content selected by the user is reproduced. As a result, it is possible to avoid a situation and the like in which the content is not reproduced. It should be noted that displaying the reproduction apparatus list 90 shown in FIG. 8 may be omitted, and a reproduction screen indicating that reproduction is performed in the mobile terminal 30 may be displayed.

In the case where the manual reproduction mode is set, the reproduction apparatus list 70 shown in FIG. 6 and the like is displayed. Further, the nearby reproduction apparatus 10N selected by the user is selected as the reproduction apparatus 10 to be a subject that is instructed to reproduce a content.

The selected nearby reproduction apparatus 10N is instructed to reproduce the content. Of course, the mobile terminal 30 can be selected in some cases. In this case, the mobile terminal 30 reproduces the content.

In the second area 72, the nearby reproduction apparatuses 10N are arranged in an order closer from the user who holds the mobile terminal 30. Thus, the user can easily grasp a correspondence relationship between the nearby reproduction apparatus 10N displayed in the reproduction apparatus list 70 and the reproduction apparatus 10 that exists in front thereof. That is, it is possible to easily determine that the nearby reproduction apparatus 10N positioned on the uppermost portion in second area 72 is the reproduction apparatus 10 closest from the user himself/herself.

As a result, it is possible to easily select a desired reproduction apparatus 10. It should be noted that in this embodiment, on the basis of the apparatus information of reproduction apparatus 10, the icon 74, the model name, and the like are displayed. Further, a distance from the mobile terminal 30 is displayed. As a result, it is possible to more easily grasp a correspondence between the nearby reproduction apparatus 10N in the reproduction apparatus list 70 and the reproduction apparatus 10 that exists in front thereof. As a result, it is possible to reproduce the content by the desired reproduction apparatus 10.

In the case where the nearby reproduction apparatus 10N is not detected, the reproduction apparatus list 90 shown in FIG. 8 is displayed. As a result, the user can easily grasp that the nearby reproduction apparatus 10N does not exist, and can move to a position where the reproduction apparatus 10 can be detected while holding the mobile terminal 30. Alternatively, in the case where the reproduction apparatus 10 exists in front thereof, but is not detected, for example, it is possible to confirm the case where a main power supply of the reproduction apparatuses 10 is off, the case where another user restricts the reproduction operation, and the like. That is, a cue to confirm a cause of non-detection of the reproduction apparatus 10 is given, and it is possible to cope with this as appropriate.

It should be noted that in the manual reproduction mode, in the case where the nearby reproduction apparatus 10N is not detected, the mobile terminal 30 may automatically reproduce the content.

In this embodiment, during the content reproduction, the reproduction apparatus 10 can be changed. For example, the user selects the reproduction apparatus display unit 83 in the reproduction screen 80 shown in FIG. 7. As a result, the change process for the reproduction apparatus 10 is performed. Of course, the operation for changing the reproduction apparatus 10 is not limited, and another operation may be input.

When a change operation for the reproduction apparatus 10 is input, the beacon signal 50 is scanned. A current reproduction apparatus list is generated, and is displayed on the touch panel 36. The user selects a desired reproduction apparatus 10 (nearby reproduction apparatus 10N), and thus can easily change the reproduction apparatus 10 that reproduces the content. In the second area 72, the nearby reproduction apparatuses 10N are displayed in an order of a closer distance, so the desired reproduction apparatus 10 can be easily selected.

The change operation for the reproduction apparatus 10 is input, and the beacon signal 50 is scanner. The assumption is made the scanning shows a different result from the preceding scanning in that the closest reproduction apparatus 10 is different. In this case, as the closest reproduction apparatus 10, to the detected reproduction apparatus 10, newly the content reproduction may be instructed automatically. As a result, for example, in the case where the user who holds the mobile terminal 30 moves and the like, the assumption is made that the closest reproduction apparatus 10 is changed. In this case, only by inputting the change operation for the reproduction apparatus 10, it is possible to cause the closest reproduction apparatus 10 to automatically reproduce the content. In this case, displaying the reproduction apparatus list may be omitted.

As described above, in the content reproduction system 100 according to this embodiment, by receiving the beacon signal 50, the nearby reproduction apparatuses 10N are detected. Then, the reproduction apparatus list 70 including the own apparatus and the nearby reproduction apparatuses 10N is generated. As a result, it is possible to easily control the content reproduction by the own apparatus, the content reproduction by the nearby reproduction apparatus 10N, and the like, which can improve convenience of the user.

Conventionally, in the case where the user selects a content and causes the control apparatus itself or a different reproduction apparatus to reproduce the content, it is necessary to select the reproduction apparatus through an apparatus-selection GUI and the like displayed on the control apparatus, and switch the reproduction apparatuses. To achieve this, the user has to learn a selection operation for the reproduction apparatus and a switching operation of the reproduction apparatus. Further, the selection operation becomes a troublesome operation in many cases.

Further, conventionally, the order of arrangement of the reproduction apparatuses displayed on the apparatus-selection GUI displayed on the control apparatus is an alphabetical order or an order of reproduction history. Therefore, to select a desired reproduction apparatus from the GUI, the user has to remember the name of the reproduction apparatus (model number and the like).

In this embodiment, by setting the automatic reproduction mode, for example, it is possible to cause the reproduction apparatus 10 (nearby reproduction apparatuses 10N displayed on the uppermost position) closest to the user who holds the mobile terminal 30 to reproduce the content automatically. As a result, learning of the selection method for the reproduction apparatuses 10 is unnecessary, and the trouble of selecting the reproduction apparatus 10 is saved. As a result, very high convenience is exerted.

Further, even in the case where the manual reproduction mode is set, in the second area 72 of the reproduction apparatus list 70, the nearby reproduction apparatuses 10N are displayed in the order closer to the user (mobile terminal 30). Accordingly, even if the name (model number) and the like of the reproduction apparatus 10 is not remembered, on the basis of a distance to the reproduction apparatus 10 that exists in front thereof, the desired reproduction apparatus 10 can be easily selected from the reproduction apparatus list 70. The same holds true for switching of the reproduction apparatuses 10, and very high convenience is exerted.

Further, in this embodiment, on the beacon signal 50, the nearby reproduction apparatus 10N is detected. Accordingly, to perform the neighborhood detection of the reproduction apparatuses 10, there is no need to additionally mount a dedicated device such as a nearby sensor, a lens, and the like. As a result, it is possible to sufficiently suppress a device cost, and it is possible to achieve an improvement in price competitiveness of the device to control the content reproduction (in this embodiment, the mobile terminal 30) and the reproduction apparatuses 10.

<Different Embodiments>

The present technology is not limited to the embodiment described above, and different various embodiments can be achieved.

Figure 9:
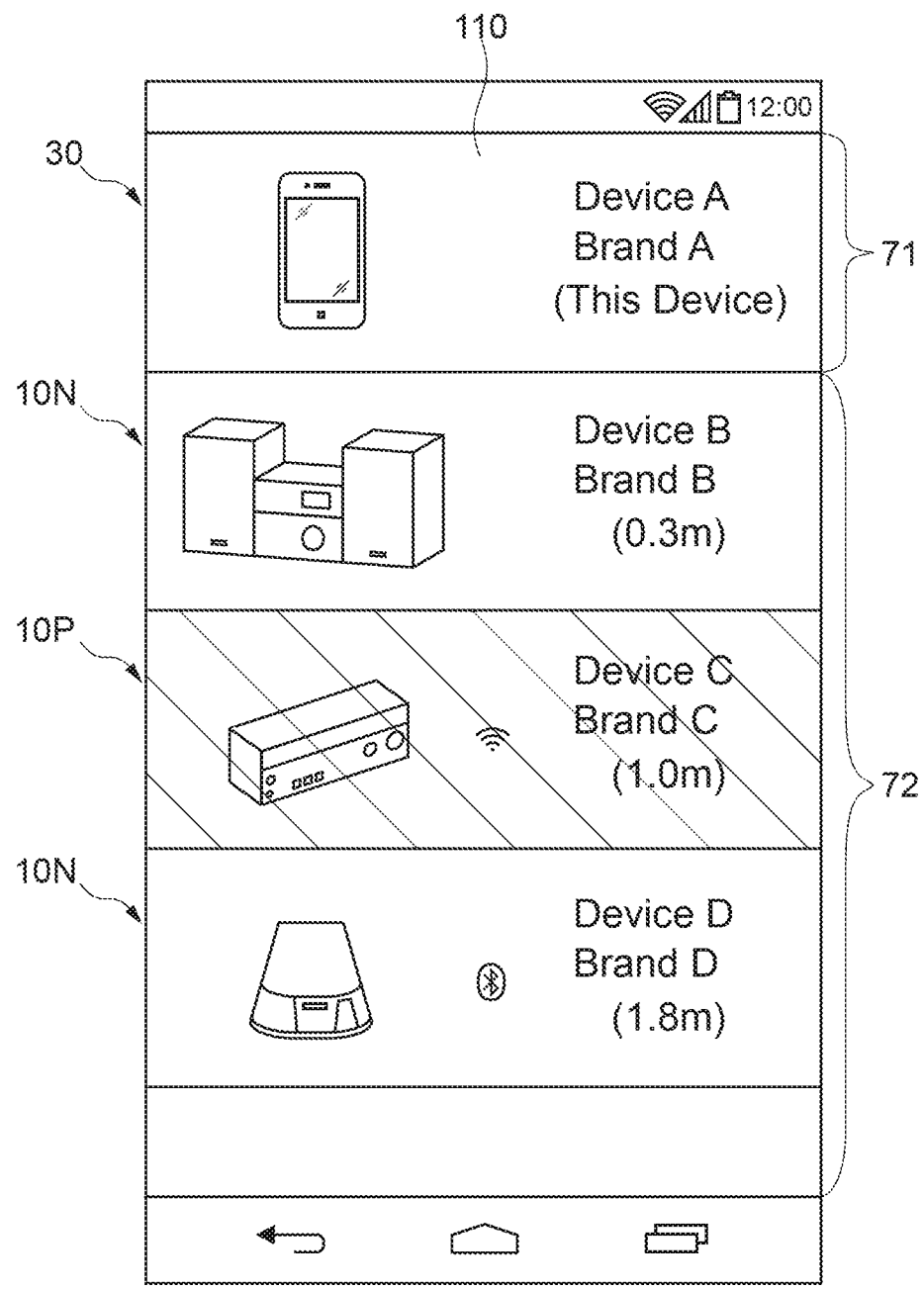
FIG. 9 A schematic diagram showing another example of a reproduction apparatus list.
Figure 10:
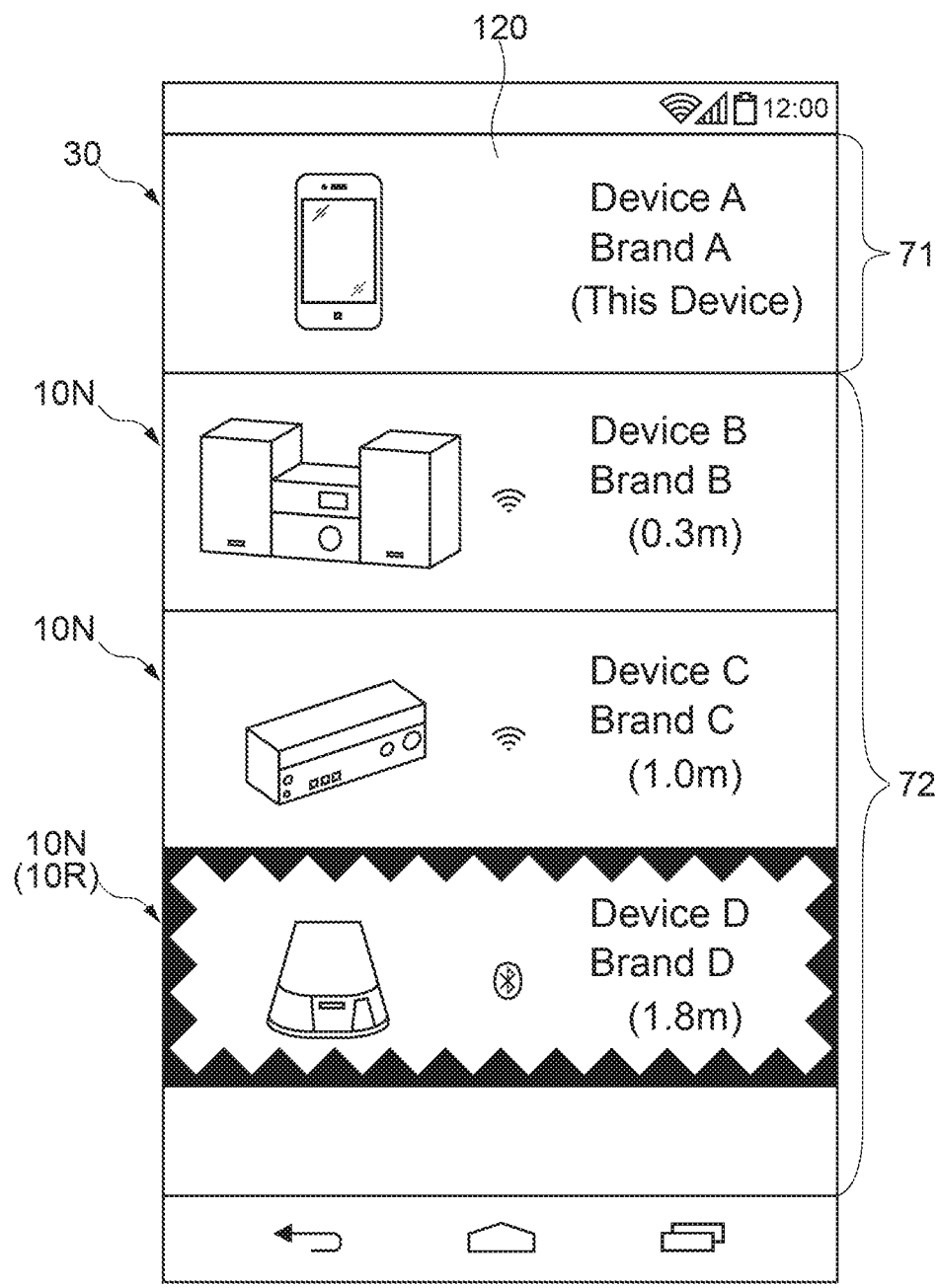
FIG. 10 A schematic diagram showing another example of a reproduction apparatus list.

FIG. 9 and FIG. 10 are schematic diagrams each showing other examples of the reproduction apparatus list. In a reproduction apparatus list 120 shown in FIG. 9, reproduction apparatuses 10P which are detected as the nearby reproduction apparatuses 10N in the past, and are not detected as the nearby reproduction apparatuses 10N currently are displayed in a reproduction apparatus list 110 so as to be recognizable. In the example shown in FIG. 9, a background color is grayed (gray out). Of course, a recognizable display form is not limited.

Typically, information relating to the reproduction apparatuses 10P which are detected as the nearby reproduction apparatuses 10N at a time of the preceding scanning and are not detected at a time of scanning at this time is displayed in a gray-out manner. Of course, instead, the detected reproduction apparatuses 10 may be displayed within the predetermined number of times in the past. The display position of the reproduction apparatuses 10P, which are detected in the past but are not detected currently are not limited, on arbitrary positions in the reproduction apparatus list 110, the reproduction apparatuses 10P may be displayed. In the example shown in FIG. 9, on the basis of the distance from the mobile terminal 30 at a time of the past detection, the display position determined. That is, the nearby reproduction apparatuses 10N currently detected, and the reproduction apparatuses 10P detected in the past are arranged in the order of the distance from the mobile terminal 30 at the time of the respective detections.

The reproduction apparatuses 10P, which are detected in the past but are not detected currently are displayed so as to be recognizable, with the result that the user can grasp a past reproduction environment and the like. By moving to an appropriate position and the like, it is possible to achieve a desired reproduction environment. For example, it is easily possible to reproduce a past reproduction environment.

Regarding the reproduction apparatus list 120 shown in FIG. 10, by the reproduction control unit 46, from the nearby reproduction apparatuses 10N displayed in the second area 72, a reproduction apparatus 10R which is selected by the user and is optimal to content reproduction is selected. For example, functional information and system information included in apparatus information of the reproduction apparatuses 10 are referred to, and the reproduction apparatus 10 for which an equalizer setting optimal to the selected content reproduction is selected. Alternatively, the reproduction apparatuses 10 having high-quality amplifier, speaker, and the like are selected. In addition, a method of selecting the reproduction apparatuses 10 optimal to the content reproduction is not limited.

As shown in FIG. 10, the list generation unit 45 causes the optimal reproduction apparatus 10R selected by the reproduction control unit 46 is displayed in the second area 72 so as to be recognizable. For example, a frame and the like with an eye-catching color such as red and the like is displayed around the reproduction apparatus 10R. Alternatively, a text of "optimal", "recommend", or the like may be added thereto. In addition, the recognizable display form is not limited.

In the reproduction apparatus list 120, the optimal reproduction apparatus 10R is displayed recognizably, with the result that it is possible to assist the user to select the reproduction apparatus 10, which improves convenience for the user.

The information relating to the own apparatus (mobile terminal 30) and the information relating to the nearby reproduction apparatuses 10N displayed in the reproduction apparatus list 120 are not limited, and arbitrary information may be displayed. For example, arbitrary information including apparatus information, functional information, system information, and the like obtained from the reproduction apparatuses 10 may be displayed. For example, a speaker, an exterior color, and the like that constitute the reproduction apparatus 10 are reflected, and the icon 74 of the nearby reproduction apparatus 10N may be generated. As a result, it is easily select the reproduction apparatus 10.

Further, as the information relating to the nearby reproduction apparatuses 10N, a display order at a time of displaying in the past in the second area 72 may be displayed. For example, in the case where the reproduction apparatus is currently displayed fourthly and displayed secondly in the past, this is displayed. As a result, it is possible to grasp the past reproduction environment and the like.

In the above description, in the second area 72, the nearby reproduction apparatuses 10N are displayed in the order in which the intensity of the beacon signal 50 is larger. The order is not limited to this. In another order based on the beacon signal 50, the nearby reproduction apparatuses 10N may be displayed. For example, on the basis of the information included in the beacon signal 50, the displaying order may be decided.

In the automatic reproduction mode, on the basis of the apparatus information relating to the reproduction apparatuses 10, the reproduction apparatus 10 which is instructed to reproduce the content may be selected. For example, to the reproduction apparatus 10R optimal for reproduction of the content described above, the content reproduction may be automatically instructed.

In the above description, the first area 71 in which the own apparatus is displayed is displayed on the upper area of the second area 72 in which the nearby reproduction apparatuses 10N are displayed. As a result, it is possible to easily discriminate and recognize the own apparatus and nearby reproduction apparatuses 10N, which makes the selection of the reproduction apparatus 10 easy. It should be noted that the positional relationship between the first and second areas 71 and 72 is not limited, and may be set as appropriate.

In the above description, the reproduction apparatus which can reproduce the content selected by the user and is disposed in the vicinity is selected as the nearby reproduction apparatus 10N. However, irrespective of whether the content selected by the user can be reproduced or not, the reproduction apparatus 10 which is determined to be located in the vicinity may be displayed in the second area 72 as the nearby reproduction apparatus 10N. In this case, the reproduction apparatus 10 which cannot reproduce the content selected by the user may be displayed so as to be recognizable, for example, in a gray-out display manner and the like.

In the above description, as the reproduction operation received in Step 101, the example of selecting the content from the content list 60 is cited. The example of the reproduction operation is not limited to this. The content may be searched for by voice, and a reproduction instruction may be input. For example, when the user inputs voice of "I want to listen to (music name)" and the like, a reproduction operation to reproduce the content of the music name is received. For the user, inputting the music name of desired music achieve automatic reproduction by the reproduction apparatus 10 which exists in the vicinity thereof. As a result, it is possible to listen or view music, video, or the like without a trouble.

In the above, the description is given on the case where by the computer such as the mobile terminal 30 and the like operated by the user, the information processing method according to the present technology is executed. However, by another computer capable of performing communication with the computer operated by the user via the network or the like, the information processing method and the program according to the present technology may be executed. Further, the computer operated by the user and another computer may construct the content reproduction system according to the present technology in conjunction with each other.

That is, the information processing method and the program according to the present technology can be executed not only by a computer system constituted of a single computer but also by a computer system in which a plurality of computers are operated in conjunction with each other. It should be noted that in this disclosure, the system means a set of a plurality of components (apparatuses, modules (parts), and the like) irrespective of whether all the components are provided in the same casing or not. Thus, a plurality of apparatuses which are stored in separate casings and are connected via a network and one apparatus in which a plurality of modules are stored in one casing are systems.

The execution of the information processing method and the program by the computer system according to the present technology includes, for example, the case where the detection of the nearby reproduction apparatus and the generation of the reproduction apparatus list are performed by a single computer and the case where the respective processes are performed by different computers. Further, the execution of the respective processes by the predetermined computer includes causing another computer to perform a part or all of the process and obtain the result.

That is, the information processing method and the program the present technology can be applied to a configuration of cloud computing in which one function is shared by a plurality of apparatuses via a network and processed in cooperation with one another.

Out of characteristic parts according to the present technology described above, at least two characteristic parts can be combined. That is, the various characteristic parts described in the above embodiments may be arbitrarily combined without sectioning the embodiments. Further, the various effects described above are merely examples and are not limited. Other effects may be exerted.

It should be noted that, the present technology can take the following configurations.

(1) A reproduction apparatus, including:
  a reproduction unit capable of reproducing a content;
  a detection unit that receives a beacon signal transmitted from a different reproduction apparatus capable of reproducing the content, and detects one or more nearby reproduction apparatuses that are located in a vicinity; and
  a generation unit that generates an operation image including a first area in which an own apparatus is displayed and a second area in which the detected one or more nearby reproduction apparatuses are displayed in an order based on the received beacon signal.

(2) The reproduction apparatus according to (1), further including:
  a reproduction control unit that causes the reproduction unit to reproduce the content in a case where the one or more nearby reproduction apparatuses are not detected.

(3) The reproduction apparatus according to (1) or (2), in which
the first area is set above the second area in the operation image.

(4) The reproduction apparatus according to any one of (1) to (3), in which
the generation unit causes the one or more nearby reproduction apparatuses to be displayed in the second area in an order in which an intensity of the received beacon signal is large.

(5) The reproduction apparatus according to (2), in which
the reproduction control unit selects, from the one or more nearby reproduction apparatuses displayed in the second area, the different reproduction apparatus as a subject that is instructed to reproduce the content.

(6) The reproduction apparatus according to (2) or (5), in which
the reproduction control unit instructs the nearby reproduction apparatus to reproduce the content displayed on an uppermost position in the second area.

(7) The reproduction apparatus according to any one of (1) to (6), in which
the generation unit causes at least one of a distance from the reproduction apparatus to each of the nearby reproduction apparatuses and apparatus information relating to the nearby reproduction apparatuses to be displayed in the second area as information of the nearby reproduction apparatuses.

(8) The reproduction apparatus according to (7), in which
the apparatus information relating to the nearby reproduction apparatuses includes information of functional components that constitute the nearby reproduction apparatuses.

(9) The reproduction apparatus according to any one of (1) to (8), in which
the generation unit causes a displaying order at a time of displaying in the second area in a past to be displayed in the second area as information of the nearby reproduction apparatuses.

(10) The reproduction apparatus according to any one of (1) to (9), in which
the generation unit causes the different reproduction apparatus that is detected as the nearby reproduction apparatus in a past, and is not detected as the nearby reproduction apparatus currently to be displayed in the operation image recognizably.

(11) The reproduction apparatus according to any one of (1) to (10), in which
the generation unit selects, from the one or more nearby reproduction apparatuses displayed in the second area, the nearby reproduction apparatus optimal for reproduction of the content, and causes the optimal nearby reproduction apparatus to be displayed in the second area recognizably.

(12) The reproduction apparatus according to any one of (1) to (11), in which
the detection unit detects the different reproduction apparatus that transmits the beacon signal as the nearby reproduction apparatus in a case where an intensity of the received beacon signal is equal to or more than a predetermined threshold value.

(13) The reproduction apparatus according to any one of (1) to (11), in which
the detection unit detects the different reproduction apparatus that transmits the received beacon signal as the nearby reproduction apparatus.

(14) The reproduction apparatus according to any one of (1) to (13),
the reproduction apparatus being capable of being held by the user.

REFERENCE SIGNS LIST

10 . . . reproduction apparatus
10N . . . nearby reproduction apparatus
10P . . . reproduction apparatus that is detected in past and is not detect currently
10R . . . reproduction apparatus optimal for content reproduction
11 . . . network module
12 . . . Bluetooth module
30 . . . mobile terminal
41 . . . network module
42 . . . Bluetooth module
43 . . . apparatus detection unit
44 . . . distance calculation unit
45 . . . list generation unit
46 . . . reproduction control unit
50 . . . beacon signal
70, 90, 110, 120 . . . reproduction apparatus list
71 . . . second area
72 . . . second area
100 . . . content reproduction system

What is claimed is:

1. A reproduction apparatus, comprising:
a reproduction processor capable of reproducing a content;
a detection processor that receives a beacon signal transmitted from a different reproduction apparatus capable of reproducing the content, and detects one or more nearby reproduction apparatuses that are located in a vicinity;
a generation processor that generates an operation image including a first area in which an own apparatus is displayed and a second area in which the detected one or more nearby reproduction apparatuses are displayed in an order based on the received beacon signal; and
a reproduction control processor that causes the reproduction processor to reproduce the content in a case where the one or more nearby reproduction apparatuses are not detected.

2. The reproduction apparatus according to claim 1, wherein
the first area is set above the second area in the operation image.

3. The reproduction apparatus according to claim 1, wherein
the generation processor causes the one or more nearby reproduction apparatuses to be displayed in the second area in an order in which an intensity of the received beacon signal is large.

4. The reproduction apparatus according to claim 1, wherein
the reproduction control processor selects, from the one or more nearby reproduction apparatuses displayed in the second area, the different reproduction apparatus as a subject that is instructed to reproduce the content.

5. The reproduction apparatus according to claim 1, wherein
the reproduction control processor instructs the nearby reproduction apparatus to reproduce the content displayed on an uppermost position in the second area.

6. The reproduction apparatus according to claim 1, wherein
the generation processor causes at least one of a distance from the reproduction apparatus to each of the nearby reproduction apparatuses and apparatus information relating to the nearby reproduction apparatuses to be displayed in the second area as information of the nearby reproduction apparatuses.

7. The reproduction apparatus according to claim 6, wherein
the apparatus information relating to the nearby reproduction apparatuses includes information of functional components that constitute the nearby reproduction apparatuses.

8. The reproduction apparatus according to claim 1, wherein
the generation processor causes a displaying order at a time of displaying in the second area in a past to be displayed in the second area as information of the nearby reproduction apparatuses.

9. The reproduction apparatus according to claim 1, wherein
the generation processor causes the different reproduction apparatus that is detected as the nearby reproduction apparatus in a past, and is not detected as the nearby reproduction apparatus currently to be displayed in the operation image recognizably.

10. The reproduction apparatus according to claim 1, wherein
the generation processor selects, from the one or more nearby reproduction apparatuses displayed in the second area, the nearby reproduction apparatus optimal for reproduction of the content, and causes the optimal nearby reproduction apparatus to be displayed in the second area recognizably.

11. The reproduction apparatus according to claim 1, wherein
the detection processor detects the different reproduction apparatus that transmits the beacon signal as the nearby reproduction apparatus in a case where an intensity of the received beacon signal is equal to or more than a predetermined threshold value.

12. The reproduction apparatus according to claim 1, wherein
the detection processor detects the different reproduction apparatus that transmits the received beacon signal as the nearby reproduction apparatus.

13. The reproduction apparatus according to claim 1, the reproduction apparatus being capable of being held by the user.

14. A non-transitory program causing a computer system to execute
a step of receiving a beacon signal transmitted from a different reproduction apparatus capable of reproducing a content, and detecting one or more nearby reproduction apparatuses that are located in a vicinity,
a step of generating an operation image including a first area in which an own apparatus is displayed and a second area in which the detected one or more nearby reproduction apparatuses are displayed in an order based on the received beacon signal; and
a step of reproducing the content in a case where the one or more nearby reproduction apparatuses are not detected.

15. An information processing method, comprising:
receiving a beacon signal transmitted from a different reproduction apparatus capable of reproducing a content, and detecting one or more nearby reproduction apparatuses that are located in a vicinity by a computer system;
generating, by the computer system, an operation image including a first area in which an own apparatus is displayed and a second area in which the detected one or more nearby reproduction apparatuses are displayed in an order based on the received beacon signal; and
reproducing, by the computer system, the content in a case where the one or more nearby reproduction apparatuses are not detected.

16. The information processing method according to claim 15, further comprising causing, by the computer system, the one or more nearby reproduction apparatuses to be displayed in the second area in an order in which an intensity of the received beacon signal is large.

17. The information processing method according to claim 15, further comprising selecting, by the computer system, from the one or more nearby reproduction apparatuses displayed in the second area, the different reproduction apparatus as a subject that is instructed to reproduce the content.

18. The information processing method according to claim 15, further comprising instructing, by the computer system, the nearby reproduction apparatus to reproduce the content displayed on an uppermost position in the second area.

19. The information processing method according to claim 15, further comprising causing, by the computer system, at least one of a distance from the reproduction apparatus to each of the nearby reproduction apparatuses and apparatus information relating to the nearby reproduction apparatuses to be displayed in the second area as information of the nearby reproduction apparatuses.

20. The information processing method according to claim 15, further comprising causing, by the computer system, a displaying order at a time of displaying in the second area in a past to be displayed in the second area as information of the nearby reproduction apparatuses.

* * * * *